Feb. 20, 1951  J. C. BENDER ET AL  2,542,893
INSPECTION OF FERRO-MAGNETIC MATERIALS
Filed Oct. 3, 1946  2 Sheets-Sheet 1
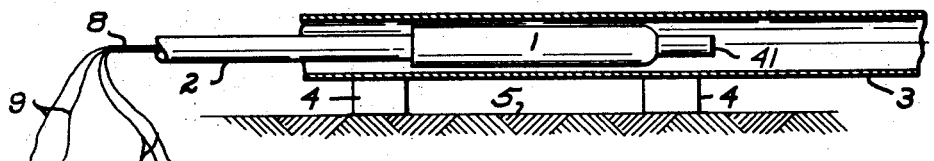
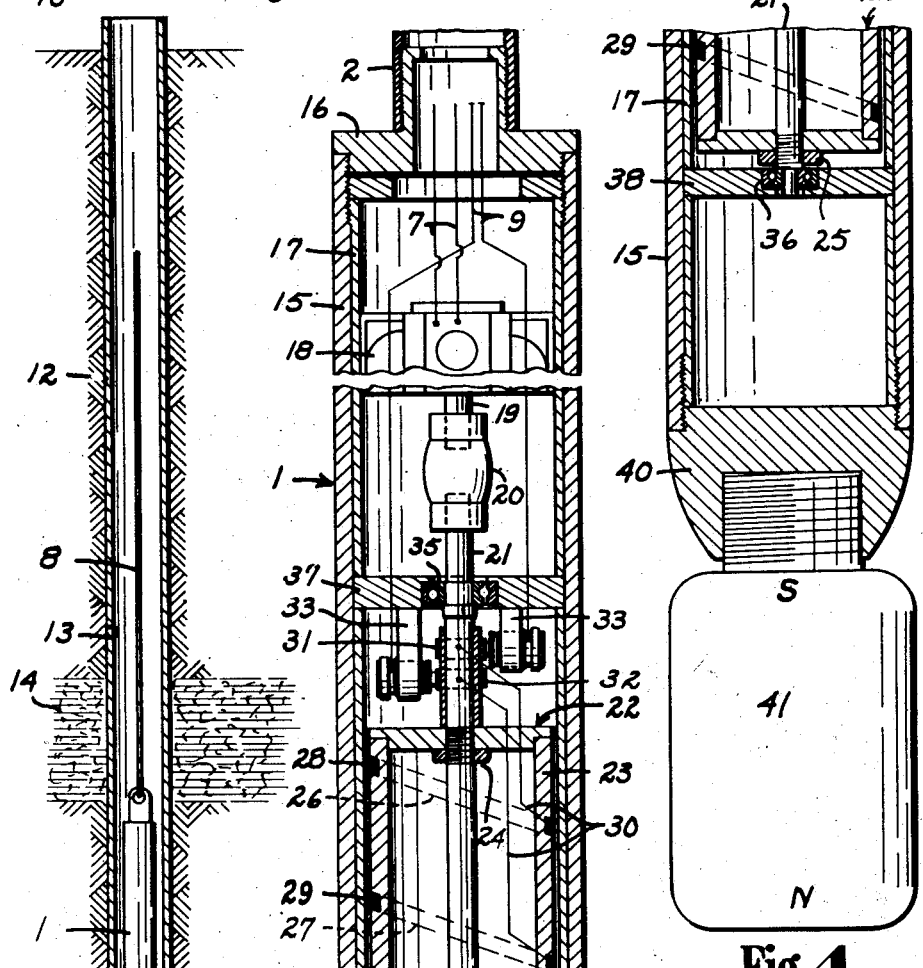
J. C. BENDER
B. J. KALB
Lester B. Clark
Ray L. Smith
INVENTORS
BY
ATTORNEYS Feb. 20, 1951   J. C. BENDER ET AL   2,542,893
INSPECTION OF FERRO-MAGNETIC MATERIALS
Filed Oct. 3, 1946   2 Sheets-Sheet 2

Inventors
J. C. BENDER
B. J. KALB

By Lester B. Clark
& Ray L. Smith
Attorneys

Patented Feb. 20, 1951

2,542,893

UNITED STATES PATENT OFFICE 2,542,893

INSPECTION OF FERRO-MAGNETIC MATERIALS

John C. Bender and Bernard J. Kalb, Houston, Tex.

Application October 3, 1946, Serial No. 700,982

2 Claims. (Cl. 175—183)

This invention relates to the detection of flaws such as cracks, pits, fissures, and the like, in metallic objects, especially tubular objects, and is of particular utility in the detection of such flaws in sections of strings of pipe used as drill pipe for wells or the casing used in such wells.

In the drilling and producing of deep wells, such as oil and gas wells, it is of extreme importance that the physical condition of strings of pipe used therein be known. In particular is this true in the case of drill pipe which may fail because of flaws therein, and require expensive fishing and/or sidetracking operations with possible total loss of the hole. It is therefore of importance that a non-destructive test be provided that is applicable to drill stem sections before incorporating such sections in a drill stem, or that likewise may be applied to the string already made up and within the hole. In a similar manner such a test is of importance for casing pipe lowered into such wells inasmuch as a failure in such pipe may require expensive repair or replacement operations and may seriously impair or destroy the productivity of a well.

It is therefore an important object of the present invention to provide novel method and apparatus for testing drill stem or casing for or in deep wells.

Another object is to provide method and apparatus that may be used with facility and accuracy whether the test is to be made at the surface upon pipe to be lowered into a well, or within the well upon a pipe string already lowered therein.

Still another object is to subject the pipe to a magnetic flux and to detect irregularities in such flux resulting from flaws in the pipe.

In one form, the invention comprehends progressively subjecting the pipe to a strong magnetic flux, and thereafter detecting irregularities in the residual flux, such irregularities providing information as to the location, nature, and extent of the flaws.

Another object is to provide a device to be moved longitudinally of the pipe and which includes a coil moved in a manner to selectively cut magnetic lines of force where the magnetic flux is irregular due to flaws within the wall of the pipe.

Still another object is to provide a source of magnetizing force which is moved longitudinally of the pipe and a detector coil, or coils, movable to produce a sweeping action in the field of the resulting flux to detect irregularities or tufts of such flux resulting from flaws within the pipe.

The foregoing objects together with other objects and advantages of the invention will be more fully apparent from the following description considered in connection with the accompanying drawings in which:

Fig. 1 is an elevational view showing the manner of using the invention for testing individual pipe sections before lowering such sections into a well bore;

Fig. 2 is a vertical section through a well bore in which a casing has been set, a device embodying the invention being lowered within the casing to detect flaws in the walls thereof;

Figs. 3 and 4 are continuation sectional views through one form of the device embodying the invention.

Figure 5:
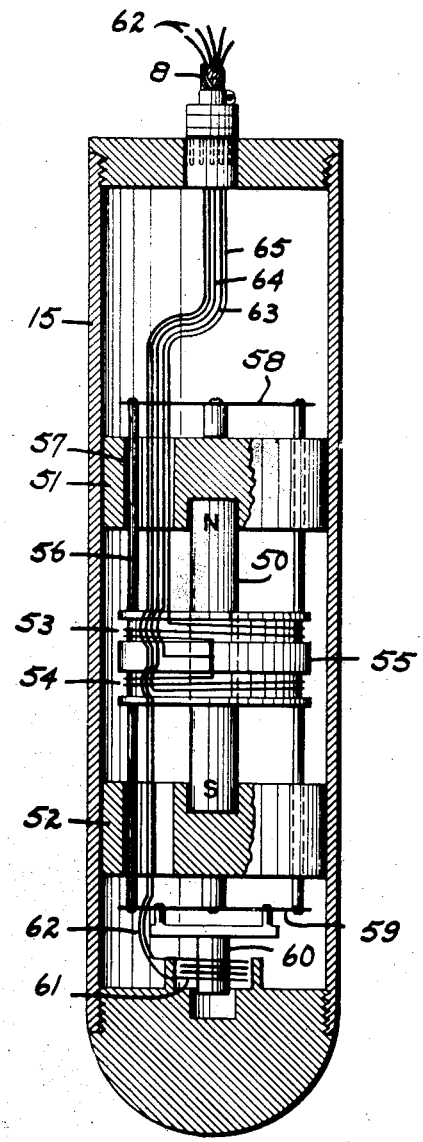
Figs. 5 and 6 are similar sectional views showing alternate forms of the device of the invention.

In Fig. 1 of the drawings, a device embodying the invention is shown at 1 attached to a hollow rod 2 so that the device may be controllably moved within the pipe 3 to be tested and mounted upon suitable supports 4 located upon the surface 5. A source of electrical energy 6 has conductors 7 which enter the conductor cable 8 leading to the device 1 to serve a purpose that will presently appear. Similarly, conductors 9 from the device 1 emerge from the cable 8 and are connected to suitable amplifying and indicating means 10 and 11.

In Fig. 2 the device is shown as lowered upon a conductor cable 8 within a casing 12 set within the bore hole 13. A sand 14 is traversed by the bore hole and it is to be understood that, as is conventional, perforations may be provided in the casing at this point for production purposes. Inasmuch as such perforations produce variations in magnetic conditions within the pipe, it is intended that in accordance with the invention, the location and extent of these perforations may also be determined so that the effectiveness of gun perforating operations within the casing 12 is likewise made known.

The device 1 as shown in Figs. 3 and 4 comprises a housing 15 having the head 16 at one end. Attached to this head is the rod 2 when the device is used in the manner shown in Fig. 1. It is to be understood that in event the device is to be lowered within a well as shown in Fig. 2, the head 16 will be suitably altered to receive the lower end of the conductor cable 8 so that movements of the device may be controlled.

The housing 15 is preferably of a nonmagnetic or diamagnetic material, a suitable material for this purpose including plastics possessing sufficient strength to withstand pressures to which the housing is subjected.

Interiorly of the upper end of the housing 15 is a liner 17 within which the motor 18 is located. This motor is supplied with electrical energy through the conductors 7 as above described. The output shaft 19 of the motor is connected through coupling 20 to shaft 21 of the rotor assembly 22. This assembly 22 comprises the rotor 23 which is secured to the shaft 21 by suitable means such as the nuts 24 and 25 thereon.

The periphery of the rotor element is grooved at 26 and 27 to receive multi-turn coils 28 and 29. These coils are interconnected and their terminals are connected through conductors 30 to slip rings 31 and 32 surrounding the shaft 21. These slip rings are in turn engaged by brushes in holders 33, such brushes having connection to conductors 9 so that electrical energy induced in the coils 28 and 29 may be transmitted to the surface and to the amplifier and indicator 10 and 11.

The shaft 21 is mounted in anti-friction bearings 35 and 36 in the barriers 37 and 38 interposed between and held in place by successive sections of the liner 17 so that the rotor assembly may rotate freely under power supplied by the motor 18.

The coils 28 and 29 are shown as connected in series, but it is to be here noted that they may be connected series aiding or series opposed, depending upon the amplitude and characteristics desired in the readings of the indicator 11. It is also emphasized that in this form of the invention, these coils 28 and 29 lie in planes which are inclined to the axis of rotation of the rotor assembly 22 so that they have an axial sweeping action along the walls of the surrounding pipe as the assembly is rotated.

The lower end of the housing 15 is closed by the plug 40 having a bar magnet 41 secured thereto so that such magnet extends outwardly from and coaxially with the housing 15.

When using the embodiment of the invention as thus far described, power is supplied to the motor 18 from the source 6 through the wires 7 whereby the rotor assembly 22 is rotated at a selected speed.

The device is then moved through the pipe to be tested. This is accomplished by manipulation of the rod or bar 2, as shown in Fig. 1, or by lowering upon the cable 8 when the device is used in the manner shown in Fig. 2. By means of such movement the magnet 41 produces a magnetizing force upon the material of the surrounding pipe shown at 3 and 12 in Figs. 1 and 2. Retentivity of the pipe will cause a continuation of the magnetic flux in the pipe, and such flux will exhibit irregularities in the forms of tufts of flux at the flaws in the walls of the pipe.

As movement of the device is continued the inductors or coils 28 and 29 successively either and leave these tufts of flux whereby an electromotive force is generated in the coils. The amplitude of this electromotive force is dependent upon various factors such as the rate of rotation of the rotor assembly, the inclination of the coils 28 and 29, the manner of connecting these coils, and the intensity of the flux cut by the coils. However, these factors are predetermined in the construction and operation of the device except that of the flux intensity and pattern thereof which is dependent upon the nature of the flaws in the pipe. Hence, the electromotive force conducted through the wires 9 is utilized to provide the desired detection of the flaws in the pipe.

Figure 6:
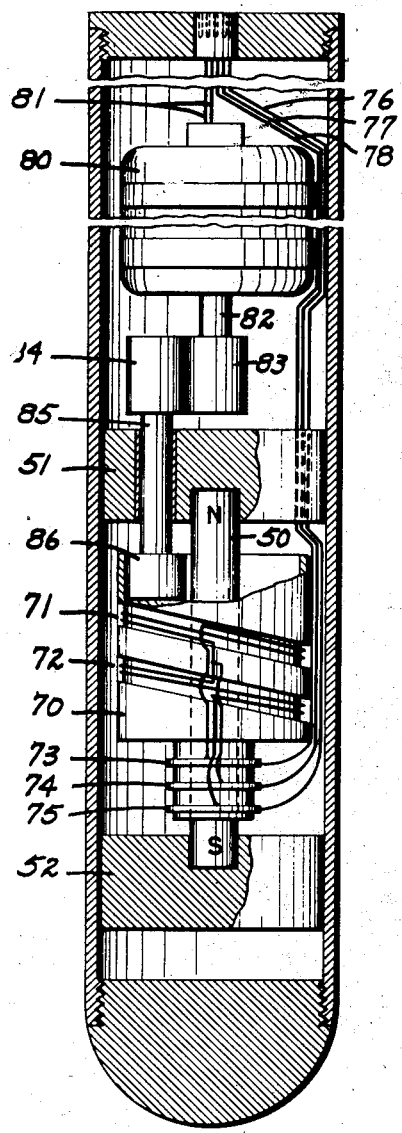

In the forms of the invention shown in Figs. 5 and 6, the source of magneto motive force comprises the bar magnet 50 having its ends fitting within pole pieces 51 and 52 which in turn fit tightly within the housing 15 so that the magnet assembly is held in place therein. The inductor in the form shown in Fig. 5 comprises coils 53 and 54 wound in grooves upon the core 55 which is in turn mounted upon rods 56 which pass through openings 57 in the respective pole pieces 51 and 52. The outer ends of these rods are attached to flexible members 58 and 59 which are centrally secured to the pole pieces 51 and 52.

The flexible member 59 has an armature 60 attached thereto and the lower end of this armature extends into a solenoid 61 so that the introduction of a variable electric current thereto through conductors 62 will effect a vibratory movement of the coil and core assembly.

In order that the coils 53 and 54 can be selectively used at the end of the cable 8, intermediate and end conductors 63, 64 and 65 are provided. This construction is used in a similar manner to that shown in Figs. 1 and 2 and explained above. It may be noted, however, that the magnetic flux used in this form of the invention is not a residual flux inasmuch as the inductors or coils 53 and 54 are provided intermediate the pole pieces 51 and 52 from which flux is transmitted to and through the surrounding pipe being tested. It is also to be noted that the coils 53 and 54 are not inclined upon the core 55. However, desired sweeping action of these coils is had by virtue of their axial vibration as the armature 60 moves axially within the coil 61 from current supplied through the conductors 62.

The form of the invention shown in Fig. 6 utilizes a rotary inductor 70 having inclined coils 71 and 72 thereon. These coils are interconnected and are provided with slip ring terminals 73, 74, and 75 from which conductors 76, 77, and 78 extend to the surface in the manner indicated in connection with Fig. 5.

Rotation of the inductor 70 is effected through operation of the motor 80 supplied with electrical energy through the cable 8 and conductors 81 thereof. The output shaft 82 has friction wheel 83 thereon which drives a complementary friction wheel 84 on shaft 85 journaled in the pole piece 51 and having a drive wheel 86 which frictionally engages the interior of the inductor rotor so that rotary action is imparted thereto.

It is to be noted that the paired inductors or coils 53 and 54 in Fig. 5, and 71 and 72 in Fig. 6 are shown connected in series opposed and provided with a center tap so that the coils may be selectively used. However, the series opposed connection may be altered to series aiding and, by selection, a parallel connection may be had. This enables flexibility in providing an induction and indicating circuit to fulfill any requirements in carrying out tests in accordance with the invention.

Broadly the invention comprehends a non-destructive method of and apparatus for detecting flaws in tubular members such as drill pipe and casing used in the drilling and production of deep wells.

The invention claimed is:

1. In a flaw detector for pipes, a housing adapted to enter and move axially of a pipe to be tested, a shaft journaled axially within said housing, a rotor mounted on said shaft, an inductor carried upon the periphery of the rotor, a prime mover mounted in the housing and connected to said shaft, an electric circuit exteriorly of the housing connnected to said inductor, and means in said circuit for indicating variations in the electromotive force induced in the inductor by rotation of the rotor, said inductor comprising a coil having at least a portion thereof lying in a plane inclined to the axis of rotation of the rotor.

2. In a flaw detector for pipes, a housing adapted to enter and move axially of a pipe to be tested, a shaft journaled axially within said housing, a rotor mounted on said shaft, an inductor carried upon the periphery of the rotor, a prime mover mounted in the housing and connected to said shaft, an electric circuit exteriorly of the housing connected to said inductor, and means in said circuit for indicating variations in the electromotive force induced in the inductor by rotation of the rotor, said inductor comprising a coil lying in a plane inclined to the axis of rotation of the rotor so that rotation of the coil produces an axial sweeping movement of the coil.

JOHN C. BENDER.
BERNARD J. KALB.

REFERENCES CITED

The following references are of record in the file of this patent:

UNITED STATES PATENTS

| Number | Name | Date |
|---|---|---|
| 1,685,965 | Spooner | Oct. 2, 1928 |
| 2,049,232 | Sydnes | July 28, 1936 |
| 2,124,579 | Knerr et al. | July 26, 1938 |
| 2,196,314 | Lee | Apr. 9, 1940 |
| 2,242,220 | Barnes et al. | May 20, 1941 |
| 2,246,542 | Smith | June 24, 1941 |
| 2,255,053 | Gunn | Sept. 9, 1941 |
| 2,308,159 | Drummond et al. | Jan. 12, 1943 |
| 2,359,894 | Brown et al. | Oct. 10, 1944 |
| 2,401,280 | Walstrom | May 28, 1946 |